US012802832B2

(12) United States Patent
Vachon et al.

(10) Patent No.: US 12,802,832 B2
(45) Date of Patent: Nov. 17, 2026

(54) METHODS AND SYSTEMS FOR EXTRACTING, SOLIDIFICATION AND DEGASSING OF RADIOACTIVE ISOTOPES FROM SPENT ION EXCHANGE RESINS

(71) Applicant: CCNUCLEAR INC., Québec (CA)

(72) Inventors: Remi Vachon, Québec (CA); Claude Lacroix, Québec (CA); Philippe Lacoste, Québec (CA); Stephane Leduc, Québec (CA)

(73) Assignee: CCNUCLEAR INC. (CA)

( * ) Notice: Subject to any disclaimer, the term of this patent is extended or adjusted under 35 U.S.C. 154(b) by 77 days.

(21) Appl. No.: 18/257,627

(22) PCT Filed: Jan. 20, 2023

(86) PCT No.: PCT/IB2023/050513
§ 371 (c)(1),
(2) Date: Jun. 15, 2023

(87) PCT Pub. No.: WO2023/139540
PCT Pub. Date: Jul. 27, 2023

(65) Prior Publication Data

US 2024/0371536 A1 Nov. 7, 2024

Related U.S. Application Data

(60) Provisional application No. 63/267,075, filed on Jan. 24, 2022.

(51) Int. Cl.
*G21F 9/00* (2006.01)
*B01D 11/02* (2006.01)
*G21F 9/06* (2006.01)

(52) U.S. Cl.
CPC .......... *G21F 9/007* (2013.01); *B01D 11/0288* (2013.01); *G21F 9/06* (2013.01)

(58) Field of Classification Search
CPC ... G21F 9/007; G21F 9/12; G21F 9/30; G21F 9/302; G21F 9/14; B01D 11/0288; B01D 11/028
See application file for complete search history.

(56) References Cited

U.S. PATENT DOCUMENTS 5,286,468 A 2/1994 Chang et al.
2011/0319699 A1 12/2011 Laurent
(Continued)

FOREIGN PATENT DOCUMENTS

BE 1026747 B1 6/2020
BE 1026748 B1 6/2020

OTHER PUBLICATIONS

Written Opinion from PCT/IB2023/050513 dated Mar. 30, 2023; 6 pgs.

(Continued)

*Primary Examiner* — Lessanework Seifu
(74) *Attorney, Agent, or Firm* — Ryan Kromholz & Manion, S.C.

(57) ABSTRACT

A system and methods for the extraction, solidification and degasification of carbon-14 isotopes ($^{14}C$) and other radioactive isotopes from spent ion exchange resins, the system comprising: a washing vessel for washing the spent resins; a reaction vessel for treating the washed spent resins with alkaline chemicals; and a decantation vessel for receiving the reacted solution and the suspended precipitate, thereby allowing for the removal of a supernatant from the remaining solution to form a solid form of carbonate and/or bicarbonate ions product, or salts thereof, comprising the radioactive isotope. A method for the extraction of a radioactive isotope from spent resins of a nuclear plant using alkaline chemicals is also provided. A method for the
(Continued)

solidification and degassing of a radioactive isotope from spent resins of a nuclear plant is further provided.

10 Claims, 5 Drawing Sheets

(56) References Cited

U.S. PATENT DOCUMENTS

| | | | | |
|---|---|---|---|---|
| 2014/0194666 | A1 | 7/2014 | Laurent | |
| 2015/0221404 | A1 | 8/2015 | Brunsell et al. | |
| 2015/0380117 | A1 * | 12/2015 | Brunsell | G21F 9/30 210/668 |
| 2018/0308597 | A1 | 10/2018 | Strohmer et al. | |

OTHER PUBLICATIONS

Search Report from PCT/IB2023/050513 dated Mar. 30, 2023; 5 pgs.
Park, S-C et al. “A Study on Adsorption and Desorption Behaviours of 14C from a mixed Bed Resin”, Nuclear Engineering and Technology, vol. 46 No. Dec. 6, 2014 pp. 847-856.
Bacur, C et al., “14C Content in Candu Spent Ion Exchange Resins and Its Release Under Alkaline Conditions”, Radiocarbon, vol. 60, Nr 6, 2018 pp. 1797-1808.
J Hansen and J Deckers, Pyrolysis of Radioactive Spent Resins in the PRIME Installation, 2020 IOP Conf. Ser.: Mater. Sci. Eng. 818 012008; 10 pages.

* cited by examiner

METHODS AND SYSTEMS FOR EXTRACTING, SOLIDIFICATION AND DEGASSING OF RADIOACTIVE ISOTOPES FROM SPENT ION EXCHANGE RESINS

FIELD OF THE INVENTION

The invention relates to a method and system for the recovery of radioactive Carbon-14 ($^{14}C$) isotopes, or other radioactive isotopes from spent resin material of nuclear power plants and other facilities. This invention more particularly relates to the use of alkaline chemicals in methods and systems for extracting, solidification and degassing of carbon-14 isotopes ($^{14}C$) from spent ion exchange resins.

BACKGROUND OF THE INVENTION

Carbon-14 ($^{14}C$) or radiocarbon is a radioactive isotope of carbon with an atomic nucleus containing 6 protons and 8 neutrons. Carbon-14 ($^{14}C$) is produced in nuclear reactors by neutron activation of Oxygen-17, nitrogen-14, and to a lesser extent carbon-13. Carbon-14 ($^{14}C$) a contaminant with an extremely long (5730 years) half-life. It can cause dosage to inhabitants by contact, inhalation or through the food cycle via photosynthesis. Therefore, it is generally accepted that release of Carbon-14 ($^{14}C$) to the environment must be minimized. However, Carbon-14 ($^{14}C$) has also shown to have a valuable commercial product for medical, pharmaceutical, agricultural and traceability of fertilizers and pesticides, as well as, in scientific research.

The CANDU (CANadian Deuterium Uranium) nuclear reactor as the particularity of generating a significant amount of radioactive carbon-14 ($^{14}C$) isotope during the reactor operation. The $^{14}C$ and other radioactive isotopes produced by the CANDU reactor are retrieved from the reactor through a purification media, that is composed of ion exchange resins.

In CANDU nuclear reactors, Carbon-14 ($^{14}C$) is produced mainly in the Moderator and Primary Heat Transport (PHT) systems. Control of Carbon-14 ($^{14}C$) emission from CANDU reactors is very effective. Over 90-95% of the C-14 produced is removed by the ion exchangers in the respective purification systems. The actual Carbon-14 ($^{14}C$) emission from the generating stations are minimal.

The $^{14}C$ isotopes are mostly present in a molecular form in the carbonate family, including but not limited to carbonate, bicarbonate, carbonic acid and carbon dioxide. The molecular form of $^{14}C$ isotopes, when kept under the proper pH conditions, are present in aqueous solution under ionic form. Therefore, the carbonate family ions containing $^{14}C$ isotopes are adsorbed by the ion exchange resins during the purification process of the CANDU reactor.

The ion exchange resins remove and contain the Carbon-14 ($^{14}C$) contaminant, but produce large volumes of spent resin waste, which create a waste disposal problem. Most spent resin waste is treated by pyrolysis for volume reduction before disposal. However, pyrolysis before removal of Carbon-14 ($^{14}C$) causes release of Carbon-14 ($^{14}C$) as a gaseous species. Such gaseous release of radioactive species is to be avoided. Consequently, removal of Carbon-14 ($^{14}C$) prior to pyrolysis is required. Because of the large volumes of spent resins waste generated and the long half-life of Carbon-14 ($^{14}C$), the long-term storage of these resins without pyrolysis and volume reduction tends to be uneconomical. Once the $^{14}C$ has been removed, the residual resins can be treated by pyrolysis and disposed of as conventional low-level waste. Furthermore, there is an interest in recovering the Carbon-14 ($^{14}C$) from these spent resins and to purify the recovered Carbon-14 ($^{14}C$) for commercial purposes.

Recovering Carbon-14 ($^{14}C$) contaminant from spent ion exchange resins waste and its enrichment is not new. For Example, the Ontario Hydro process is a known process, wherein Carbon-14 ($^{14}C$) is recovered from spent resins, then it is enriched and further converted into barium carbonate as a final product. The Ontario Hydro process consists in the extraction of $^{14}C$ from resins in an acidic environment, by using Hydrochloric acid (HCl), a strong acid, for stripping the $^{14}C$ and produce carbon dioxide ($CO_2$) with a low concentration of $^{14}C$ from the wash solution of the resins. The use of a strong acid is known to remove other gamma emitting radionuclides. The process then followed by a conversion of $CO_2$ into carbon monoxide (CO), then an isotopic enrichment process by thermal diffusion column. Essentially pure $^{14}C$ monoxide ($^{14}CO$) is obtained and oxidized to produce $^{14}C$ dioxide ($^{14}CO_2$), a gas that is then converted into barium carbonate. Reconversion of CO to C14-enriched $CO_2$, then formation of a C14-enriched barium carbonate solid.

Other methods are also known. For example, the Atomic Energy of Canada Limited (AECL) method uses a $CO_2$ gas over wet resin, resulting in a $H_2CO_3$ (carbonic acid) stripping process followed by a gas phase washing. The use of a weak acid is known for not removing other gamma emitting radionuclides.

Other technologies also use the concept of acid stripping carbonate containing $^{14}C$ from waste resin and capturing the $CO_2$ laden gas into molecular sieves. Releasing radionuclides (such as $^{14}C$) into the gaseous phase and the risk of spreading these gases environment is a known problem in the art, in particular during the upgrade from immobilization methods to volume reduction methods, namely high-temperature processing and oxidation of spent resins.

Alkaline conditions for $^{14}C$ desorption are also known. For example, Park, S-C., et al. "A Study On Adsorption and Desorption Behaviours of $^{14}C$ from a mixed Bed Resin", Nuclear Engineering and Technology, Vol 46 No. 6 Dec. 2014 pgs. 847-856. This article suggests that a $NH_4H_2PO_4$ solution is preferable for the stripping of $^{14}C$ from the spent resin.

Other alkaline conditions for $^{14}C$ desorption are also known. For example, C Bucur et al., "*$^{14}C$ Content In Candu Spent Ion Exchange Resins And Its Release Under Alkaline Conditions*", Radiocarbon, Vol. 60, Nr 6, 2018 pgs 1797-1808. This article suggests that under alkaline conditions and in the presence of sodium hydroxide (NaOH), $^{14}C$ could be released both as gaseous (7%) and as soluble species (79%) for unconditioned spent ion exchange resins (SIERs). The article suggests that SIERs may be immobilized in a suitable matrix for disposal, and the presence of Calcium (Ca) ions dissolved in cement pore water favour precipitation of $^{14}C$ and consequently the amount of $^{14}C$ released from disposal area should be lower.

Thus, despite recent advancements and desired progress in this area, there remains a need for a novel and improved methods and systems for the extraction, solidification and degasification of carbon-14 isotopes ($^{14}C$) from spent ion exchange resins in alkaline conditions.

The present invention addresses these needs and other needs as it will be apparent from the review of the disclosure and description of the features of the invention hereinafter.

BRIEF SUMMARY

In a general sense, the present technology provides a system and method system and method for the extraction, solidification and degasification of carbon-14 isotopes ($^{14}C$) and other radioactive isotopes from spent ion exchange resins in alkaline conditions.

In embodiments, there is provided a system extraction, solidification and degasification of carbon-14 isotopes ($^{14}C$) and other radioactive isotopes from spent ion exchange resins, the system comprising: a washing vessel for washing the spent resins; a reaction vessel for treating the washed spent resins with alkaline chemicals of a given concentration for a given time and at a given temperature to obtain a process solution, wherein the process solution is recirculated through the resin washing vessel and the reaction vessel by a recirculating a means, thereby allowing the extraction of carbonate and/or bicarbonate ions containing the radioactive isotope, and whereby the extracted carbonate and/or bicarbonate ions containing the radioactive isotope is reacted with a chemical of a given concentration in the reaction vessel to form a reacted solution, wherein the reacted solution is recirculated by a recirculating means within the reaction vessel to form a suspended precipitate; and a decantation vessel for receiving the reacted solution and the suspended precipitate, thereby allowing for the removal of a supernatant from the remaining solution to form a solid form of carbonate and/or bicarbonate ions product, or salts thereof, comprising the radioactive isotope.

In embodiments, there is also provided a method for the extraction of a radioactive isotope from spent resins of a nuclear plant, the method comprising the steps of: providing a first volume of spent resins; washing the spent resins in a washing vessel in a recirculating liquid of a second volume; and treating the washed spent resins with alkaline chemicals of a given concentration in a reaction vessel for a given time and at a given temperature to obtain a process solution, wherein the process solution is recirculated through the resin washing vessel and the reaction vessel by a recirculating a means, thereby allowing the extraction of carbonate and bicarbonate ions containing the radioactive isotope.

In embodiments, there is also provided a method for solidification of a radioactive isotope from spent resins of a nuclear plant, the method comprising the steps of: providing a carbonate and/or bicarbonate ions extraction solution from the spent resins containing the radioactive isotope; contacting the carbonate and/or bicarbonate ions extraction solution with a chemical of a given concentration in a reaction vessel to form a reacted solution, wherein the reacted solution is recirculated by a recirculating means within the reaction vessel to form a suspended precipitate; and transferring the reacted solution and the suspended precipitate to a decantation vessel, wherein a supernatant is removed from the remaining solution to form a solid form of carbonate and/or bicarbonate ions product, or salts thereof, comprising the radioactive isotope.

In embodiments, there is also provided a method for the degassing of a radioactive isotope from spent resins of a nuclear plant, the method comprising the steps of: providing a solid form of carbonate and/or bicarbonate ions product, or salts thereof, extracted from the spent resins of a nuclear plant; reacting the solid form of carbonate and/or bicarbonate ions product, or salts thereof in an acidic solution of a given concentration in a temperature-controlled chemical reactor, thereby producing a gas stream and a residual product; and contacting the gas stream with molecular sieves and desiccant.

Additional aspects, advantages and features of the present invention will become more apparent upon reading of the following non-restrictive description of preferred embodiments which are exemplary and should not be interpreted as limiting the scope of the invention.

BRIEF DESCRIPTION OF THE FIGURES

In order for the invention to be readily understood, embodiments of the invention are illustrated by way of example in the accompanying figures.

Further details of the invention and its advantages will be apparent from the detailed description included below.

DETAILED DESCRIPTION OF EMBODIMENTS

In the following description of the embodiments, references to the accompanying figures are illustrations of one or more examples by which the invention may be practised. It will be understood that other embodiments may be made without departing from the scope of the invention disclosed. Unless defined otherwise, all technical and scientific terms used herein have the same meaning as commonly understood by one of ordinary skill in the art to which the invention belongs.

In a most general sense, the invention provides a system and method system and method for the extraction, solidification and degasification of carbon-14 isotopes ($^{14}C$) and other radioactive isotopes from spent ion exchange resins in alkaline conditions.

In the context of the present specification, the word "about" when used in relation to numerical designations or ranges means the exact numbers plus or minus experimental measurement errors and plus or minus 10 percent of the exact numbers.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams or illustrations represent conceptual views of the principles of the present technology. Similarly, it will be appreciated that any diagrams, flowcharts, and the like represent various processes which may be substantially represented in computer-readable media and so executed by a computer or processor, whether or not such computer or processor is explicitly shown.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

Figure 1:
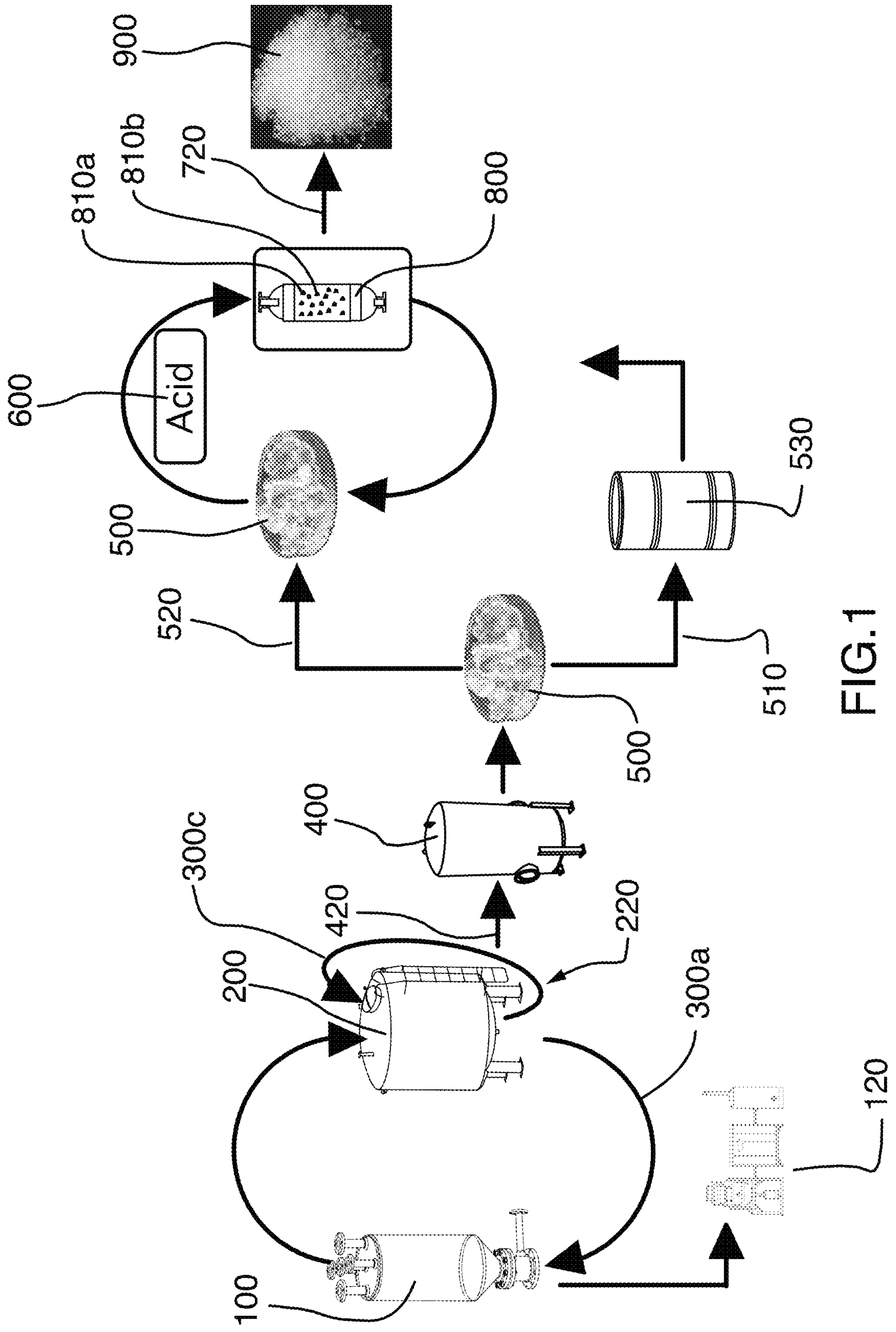
FIG. 1 schematically shows a flow chart of the overall system for the extraction, solidification and degasification of carbon-14 isotopes ($^{14}C$) and other radioactive isotopes from spent ion exchange resins.
Figure 2:
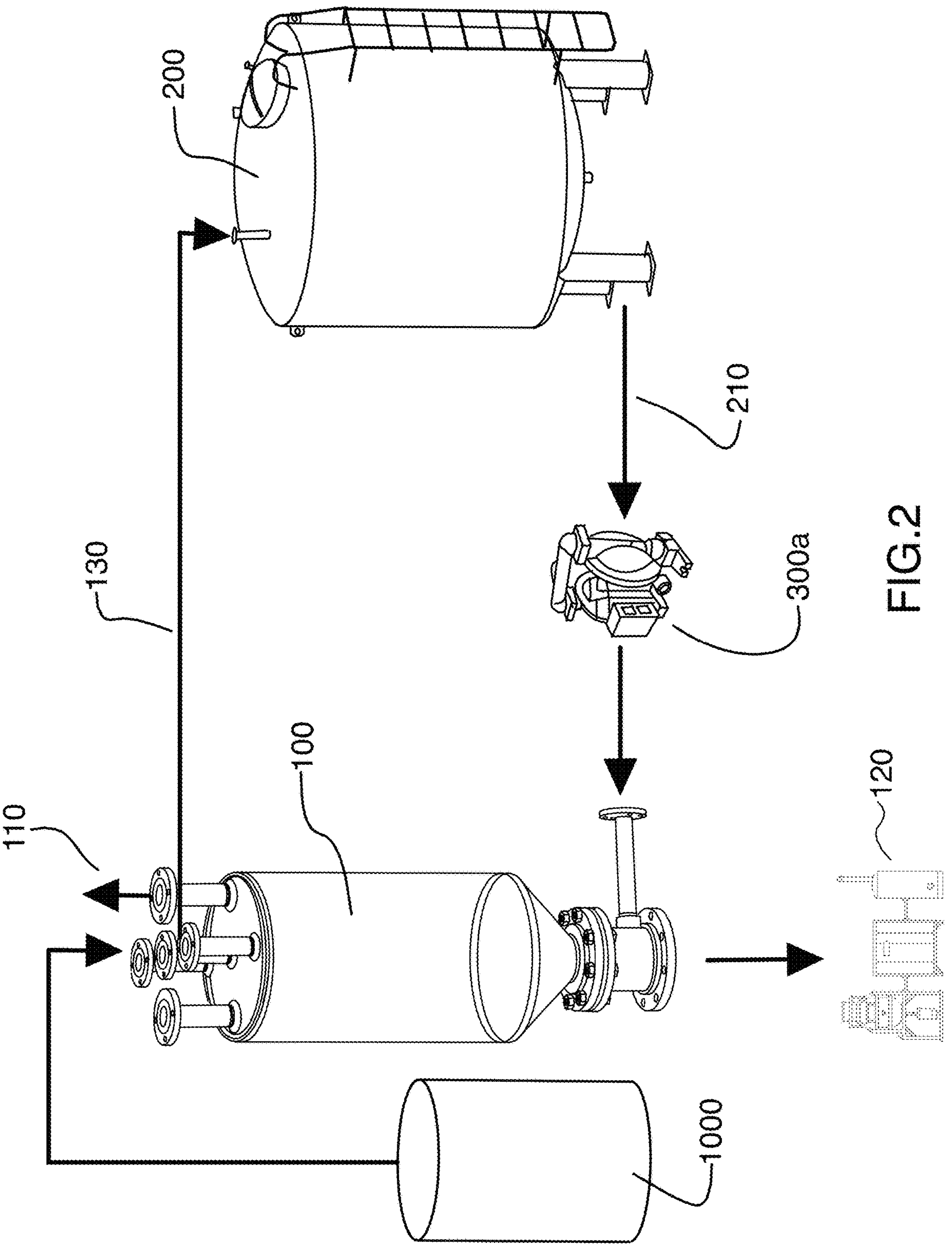
FIG. 2 schematically shows a flow chart of the overall system and method for the extraction of carbon-14 isotopes ($^{14}C$) and other radioactive isotopes from spent ion exchange resins in alkaline conditions.
Figure 3:
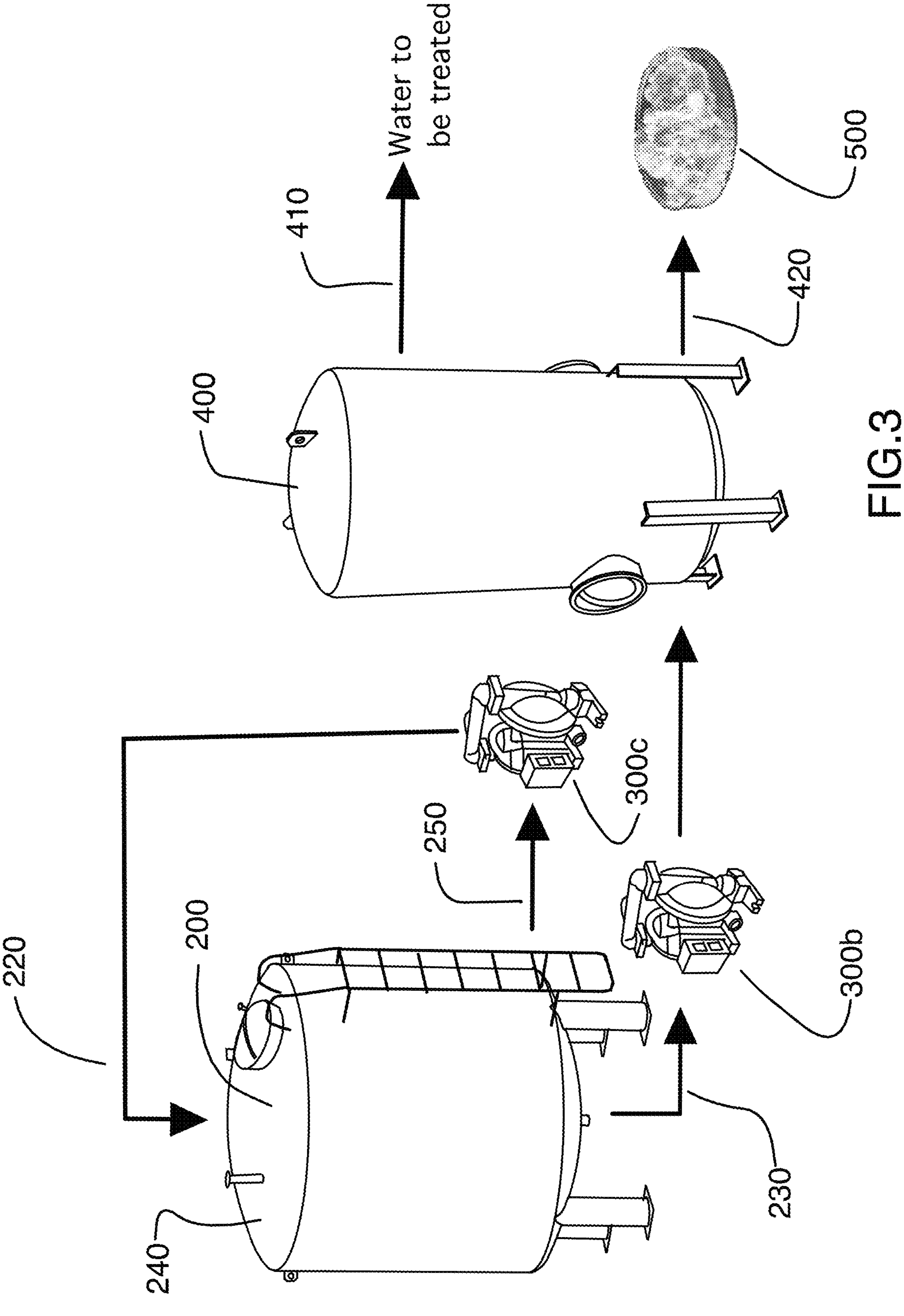
FIG. 3 schematically shows a flow chart of the overall system and method for the solidification of carbon-14 isotopes ($^{14}C$) and other radioactive isotopes from spent ion exchange resins.

Referring now to FIGS. 1-3, in embodiments of the present invention, there is provided a system for extraction, solidification and degasification of carbon-14 isotopes ($^{14}C$) and other radioactive isotopes from spent ion exchange resins, the system comprising: a washing vessel (100) for washing the spent resins (1000); a reaction vessel (200) for treating the washed spent resins with alkaline chemicals (130) of a given concentration for a given time and at a given temperature to obtain a process solution (210), wherein the process solution (210) is recirculated through the resin washing vessel (100) and the reaction vessel (200) by a recirculating a means (300*a*), thereby allowing the extraction of carbonate and/or bicarbonate ions containing the radioactive isotope, and whereby the extracted carbonate and/or bicarbonate ions containing the radioactive isotope are reacted with a chemical (220) of a given concentration in the reaction vessel (200) to form a reacted solution (250), wherein the reacted solution (250) is recirculated by a recirculating means (300*b*) within the reaction vessel (200) to form a suspended precipitate (230); and a decantation vessel (400) for receiving the reacted solution (250) and the suspended precipitate (230), thereby allowing for the removal of a supernatant (420) from the remaining solution (410) to yield a solid form of carbonate and/or bicarbonate ions product, or salts thereof (500), comprising the radioactive isotope.

Referring to FIGS. 1-4, in embodiments, the system may comprise a temperature-controlled chemical reactor (700) for reacting (520) the solid form of carbonate and/or bicarbonate ions product, or salts thereof (500) in an acidic solution (600) of a given concentration in, thereby producing a gas stream (710) and a residual product (720), wherein the gas stream (710) is contacted with molecular sieves (810*a*, 810*b*) in a container (800) and/or the residual product (720) is dried in a oven to produce solid rejects (900).

In embodiments, as illustrated in FIG. 1, the previously described system may further comprise means for storing (530) the solid form of carbonate and/or bicarbonate ions product, or salts thereof (500).

In embodiments, as illustrated in FIG. 1, the previously described system may further comprise a Pyrolysis Resins in Mobile Electric (PRIME) (120) installation for treating the resin to reduce its volume.

Still referring to the system previously described and illustrated in FIGS. 1-4, in embodiments, there is provided a system where the radioactive isotope may be C-14.

The alkaline chemicals may be selected from the group consisting of sodium hydroxide (NaOH), potassium hydroxide (KOH), ammonium hydroxide ($NH_4OH$), a monohydroxide base chemical, and any combination thereof.

The concentration of the alkaline chemical in the solution may range between about 1 to 10% (w/w).

The given temperature may range between about 0° C. to 100° C., preferably 5° C. to 70° C., most preferably 20° C. to 50° C.

The given time may range between about 30 to 180 min.

The ratio of the second volume of the recirculating liquid and the first volume of the spent resin may range from about 2:1 to 7:1.

In embodiments, the alkaline chemicals may be selected from the group consisting of sodium hydroxide (NaOH), potassium hydroxide (KOH), ammonium hydroxide ($NH_4OH$), a monohydroxide base chemical, and any combination thereof.

The concentration of the alkaline chemical in the solution may range between about 1 to 10% (w/w).

Referring now to FIG. 2, in embodiments of the present invention, there is provided a method for the extraction of a radioactive isotope from spent resins of a nuclear plant, the method comprising the steps of: providing a first volume of spent resins (1000); washing the spent resins in a washing vessel (100) in a recirculating liquid of a second volume; and treating the washed spent resins with alkaline chemicals (130) of a given concentration in a reaction vessel (200) for a given time and at a given temperature to obtain a process solution (210), wherein the process solution (210) is recirculated through the resin washing vessel (100) and the reaction vessel (200) by a recirculating a means (300*a*), thereby allowing the extraction of carbonate and bicarbonate ions containing the radioactive isotope.

In embodiments, as illustrated in FIG. 2, the radioactive isotope previously described in the method may be selected from the group consisting of C-14.

In embodiments, the alkaline chemicals may be selected from the group consisting of sodium hydroxide (NaOH), potassium hydroxide (KOH), ammonium hydroxide ($NH_4OH$), a monohydroxide base chemical, and any combination thereof.

The concentration of the alkaline chemical in the solution may range between about 1 and 10% (w/w).

The given temperature may range between about 0° C. to 100° C., preferably 5° C. to 70° C., most preferably 20° C. to 50° C.

The given time may range between about 30 to 180 min.

In embodiments, as illustrated in FIG. 2, the previously described method may have a ratio of the second volume of the recirculating liquid and the first volume of the spent resin that ranges from 2:1 to 7:1.

The resin may optionally be treated in a Pyrolysis Resins in Mobile Electric (PRIME) (120) installation to reduce its volume.

Referring now to FIG. 3, in embodiments of the present invention, there is provided a method for solidification of a radioactive isotope from spent resins of a nuclear plant, the method comprising the steps of: providing a carbonate and/or bicarbonate ions extraction solution (240) from the spent resins containing the radioactive isotope; contacting the carbonate and/or bicarbonate ions extraction solution with a chemical (220) of a given concentration in a reaction vessel (200) to form a reacted solution (250), wherein the reacted solution (250) is recirculated by a recirculating means (300*c*) within the reaction vessel (200) to form a suspended precipitate (230); and transferring the reacted solution (250) and the suspended precipitate (230) to a decantation vessel (400), wherein a supernatant (420) is removed from the remaining solution (410) to form a solid form of carbonate and/or bicarbonate ions product, or salts thereof (500), comprising the radioactive isotope.

Still referring to the method previously described and represented in FIG. 3, in embodiments, the chemical may be selected from the group consisting of calcium hydroxide ($Ca(OH)_2$), magnesium hydroxide ($Mg(OH)_2$), barium hydroxide ($Ba(OH)_2$), any other dihydroxide containing salt, and a combination thereof.

The chemical may be barium hydroxide ($Ba(OH)_2$).

Still referring to FIG. 3, in embodiment, the given concentration of the chemical (220) is dependent on the concentration of the carbonate and/or bicarbonate ions extraction solution (240).

The radioactive isotope may be C-14.

The solid form of carbonate and/or bicarbonate ions product, or salts thereof (500) may be stored (510) using storing means (530).

Figure 4:
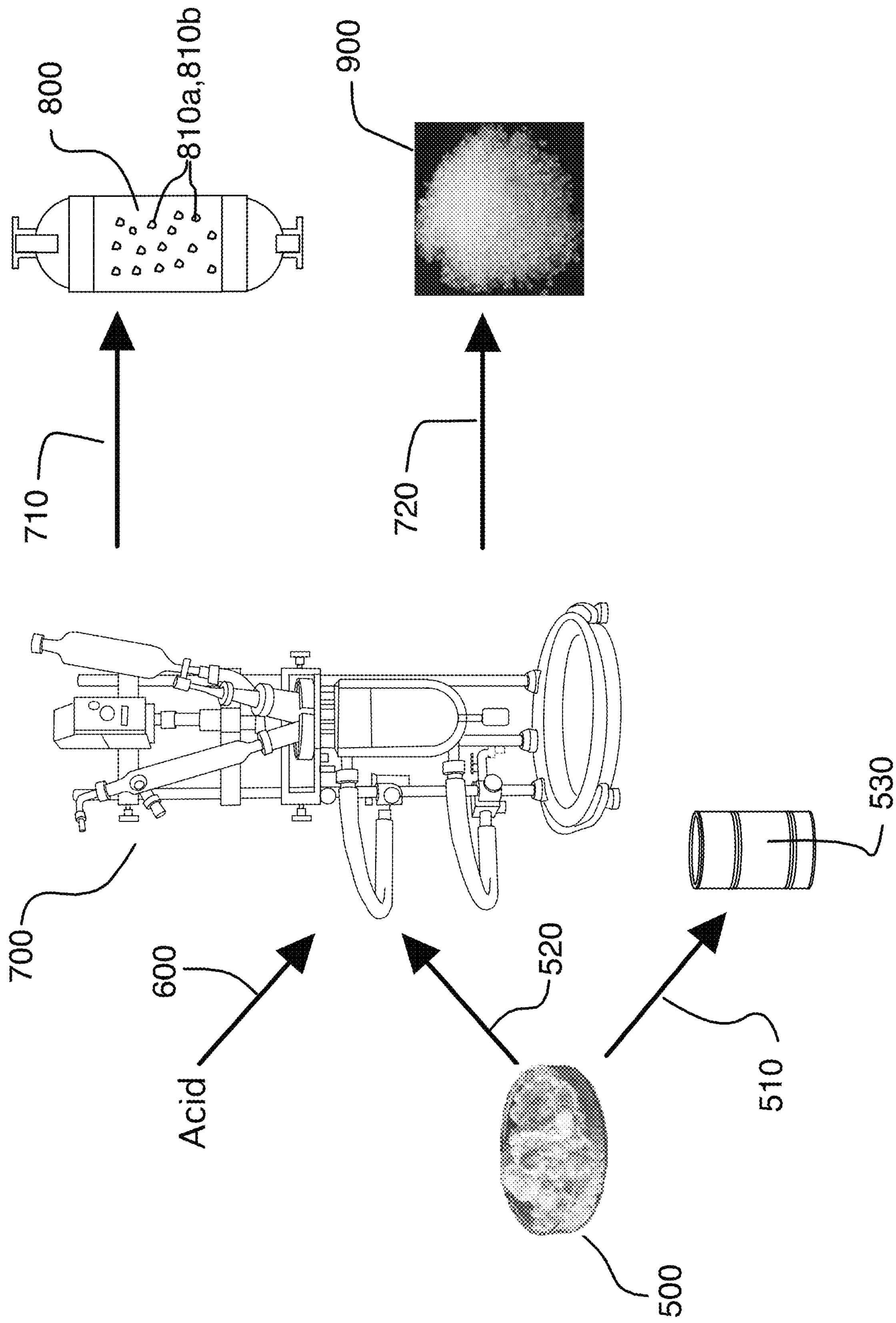
FIG. 4 schematically shows a flow chart of the overall system and method for the degasification of carbon-14 isotopes ($^{14}C$) and other radioactive isotopes from spent ion exchange resins.
Figure 5:
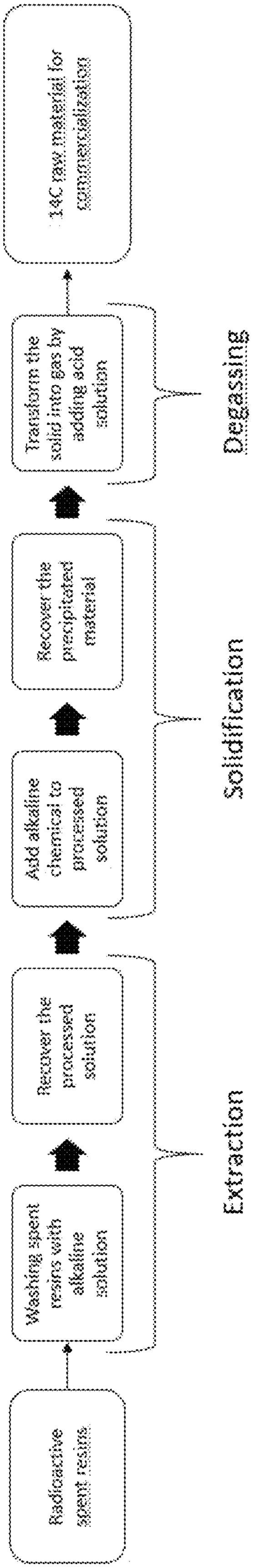
FIG. 5 schematically shows another flow chart of the overall system and method for the degasification of carbon-14 isotopes ($^{14}C$) and other radioactive isotopes from spent ion exchange resins.

In embodiments, and now referring to FIG. 4, there is provided a method for the degassing of a radioactive isotope from spent resins of a nuclear plant, the method comprising the steps of: providing a solid form of carbonate and/or bicarbonate ions product, or salts thereof (500), extracted from the spent resins of a nuclear plant; reacting (520) the solid form of carbonate and/or bicarbonate ions product, or salts thereof (500) in an acidic solution (600) of a given concentration in a temperature-controlled chemical reactor (700), thereby producing a gas stream (710) and a residual product (720); and contacting the gas stream (710) with molecular sieves (810*a*, 810*b*) in a desiccant (800).

Still referring to the method previously described and represented in FIG. 4, in embodiments, the method may further comprise the step of drying the residual product (720) in an oven to produce solid rejects (900).

In embodiments, the acidic solution may comprise inorganic and/or organic acids, or a combination thereof.

The acidic solution (600) may be selected from the group consisting of hydrochloric acid (HCl), sulfuric acid ($H_2SO_4$), nitric acid ($HNO_3$), acetic acid ($C_2H_4O_2$), citric acid ($C_6H_8O_7$).

The concentration of the acid in the acidic solution (600) may range from about 10% (w/w) to 90% (w/w), and it may be further adjusted depending on the acid used.

The radioactive isotope is C-14.

Those skilled in the art will recognize, or be able to ascertain, using no more than routine experimentation, numerous equivalents to the specific procedures, embodiments, claims, and examples described herein. Such equivalents are considered to be within the scope of this invention and covered by the claims appended hereto.

The invention claimed is:

1. A system for extraction, solidification and degasification of radioactive from spent ion exchange resins, the system comprising:

a) a washing vessel for washing the spent resins in an alkaline solution;

b) a reaction vessel for treating the washed spent resins with alkaline chemicals of a given concentration, for a given time and at a given temperature to obtain a process solution, wherein the process solution is recirculated through the resin washing vessel and the reaction vessel by a first recirculating a means, thereby allowing the extraction of carbonate and/or bicarbonate ions containing the radioactive isotope, and whereby the extracted carbonate and/or bicarbonate ions containing the radioactive isotope is reacted with a chemical of a given concentration in the reaction vessel to form a reacted solution, wherein the reacted solution is recirculated by a second recirculating means within the reaction vessel to form a suspended precipitate;

c) a decantation vessel for receiving the reacted solution and the suspended precipitate, thereby allowing for the removal of a supernatant from the remaining solution to form a solid form of carbonate and/or bicarbonate ions product, or salts thereof, comprising the radioactive isotope; and d) a temperature-controlled chemical reactor for reacting the solid form of carbonate and/or bicarbonate ions product, or salts thereof in an acidic solution of a given concentration in, thereby producing a gas stream and a residual product, and further comprising molecular sieves adapted to capture the radioactive isotope whereby the gas stream is contacted with the molecular sieves.

2. The system of claim 1, further comprising a Pyrolysis Resins in Mobile Electric (PRIME) installation for treating the residual product to reduce its volume.

3. The system of claim 1, wherein the alkaline chemicals are selected from the group consisting of sodium hydroxide (NaOH), potassium hydroxide (KOH), ammonium hydroxide ($NH_4OH$), a monohydroxide base chemical, and a combination thereof.

4. The system of claim 1, wherein the concentration of the alkaline chemical in the solution ranges between 1 to 10% (w/w).

5. The system of claim 1, wherein the given time ranges between 30 to 180 min.

6. The system of claim 1, wherein the given temperature range is between 0° C. to 100° C.

7. The system of claim 1, wherein a volume ratio of the spent resin and the reacted solution ranges from 2:1 to 7:1.

8. The system of claim 1, wherein the acidic solution comprises inorganic and/or organic acids, or a combination thereof.

9. The system of claim 7, wherein the acidic solution is selected from the group consisting of hydrochloric acid (HCl), sulfuric acid (H2SO4), nitric acid (HNO3), acetic acid (C2H4O2), and citric acid (C6H8O7).

10. The system of claim 1, wherein the concentration of the acid in the acidic solution ranges from 10% (w/w) to 90% (w/w).

* * * * *